United States Patent [19]

Lisec

[11] Patent Number: 5,704,959
[45] Date of Patent: Jan. 6, 1998

[54] DEVICE FOR DIVIDING LAMINATED GLASS

[76] Inventor: Peter Lisec, Bahnhofstrasse 34, A-3363 Amstetten-Hausmening, Austria

[21] Appl. No.: 596,181

[22] PCT Filed: Dec. 12, 1994

[86] PCT No.: PCT/AT94/00193

§ 371 Date: Feb. 5, 1996

§ 102(e) Date: Feb. 5, 1996

[87] PCT Pub. No.: WO95/16640

PCT Pub. Date: Jun. 22, 1995

[30] Foreign Application Priority Data

Dec. 13, 1993 [AT] Austria .................................. 2514/93
Jul. 4, 1994 [AT] Austria .................................. 1319/94
Jul. 4, 1994 [AT] Austria .................................. 1321/94

[51] Int. Cl.[6] .................. C03B 9/46; C03B 21/02; C03B 23/00; C03B 33/00
[52] U.S. Cl. .................. 65/174; 65/176; 65/268; 225/935
[58] Field of Search .................. 65/174, 176, 268; 225/93.5

[56] References Cited

U.S. PATENT DOCUMENTS

| 1,738,229 | 12/1929 | Campbell et al. | 225/2 |
| 3,474,944 | 10/1969 | Chatelain et al. | 65/174 |
| 4,232,809 | 11/1980 | Boehm et al. | 225/93.5 |
| 4,471,895 | 9/1984 | Lisec, Jr. | 225/2 |
| 4,552,290 | 11/1985 | Szostak | 225/2 |
| 4,558,622 | 12/1985 | Tausheck | 83/885 |
| 5,297,710 | 3/1994 | Juras | 225/2 |
| 5,475,196 | 12/1995 | Lisec | 219/121.39 |

FOREIGN PATENT DOCUMENTS

| 0 270 452 | 6/1988 | European Pat. Off. . |
| 0 596 852 | 5/1994 | European Pat. Off. . |
| 32 30 554 | 11/1983 | Germany . |
| 43 30 473 | 5/1994 | Germany . |

Primary Examiner—Donald E. Czaja
Assistant Examiner—Jacqueline A. Ruller
Attorney, Agent, or Firm—Young & Thompson

[57] ABSTRACT

The invention relates to a device for dividing laminated glass, especially two-pane laminated glass, comprising two, plate-shaped supports for the glass sheet in which one of the supports is rigidly attached in the machine from and the other support is mounted to swivel around a horizontal axis located in the area between the supports. Cutting tools can be moved in the abutting area between the two supports for scratching the laminated glass on both sides. A blade used for splitting the plastic film located between the two glass panes is mounted on a holder slide which can swivel around a horizontal axle which is aligned in a direction of movement of the holder slide.

31 Claims, 11 Drawing Sheets

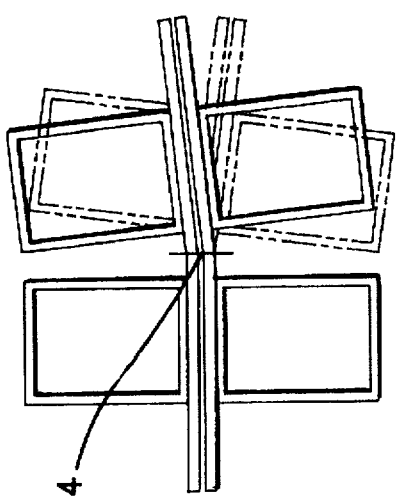
FIG. 9.1
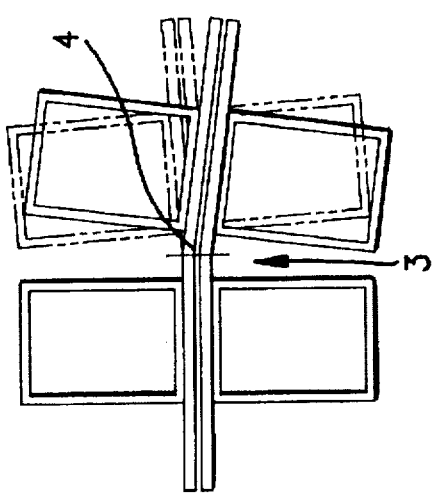
FIG. 9.2
FIG. 9.3
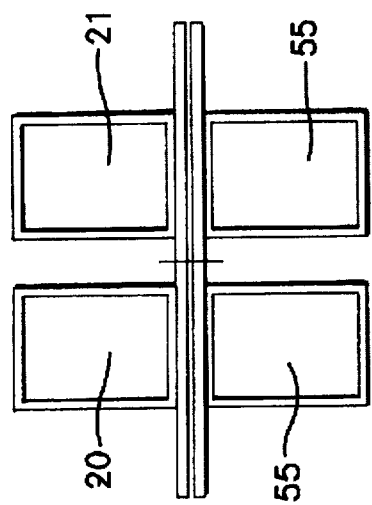
FIG. 9.4
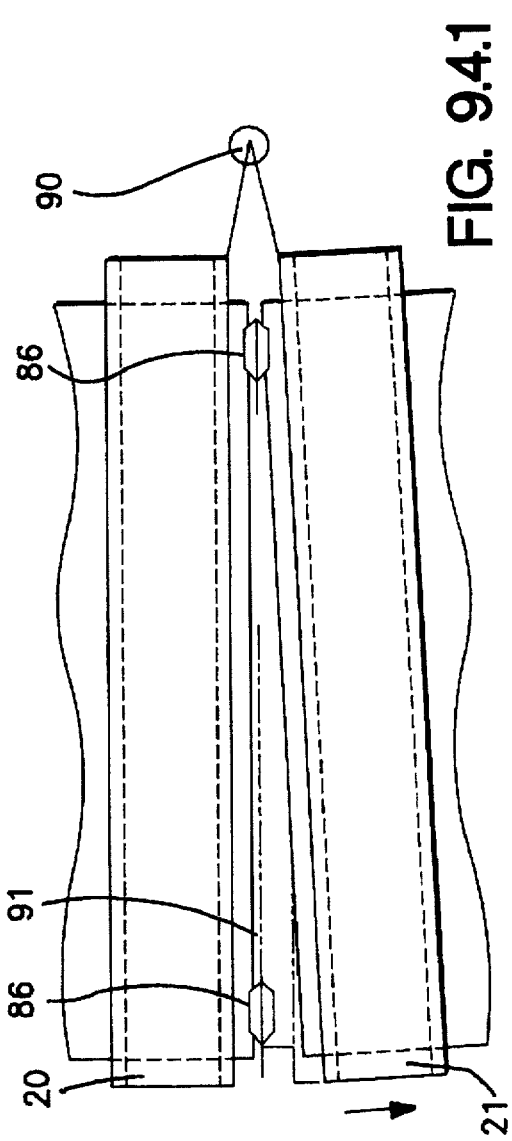
FIG. 9.4.1

DEVICE FOR DIVIDING LAMINATED GLASS

BACKGROUND OF THE INVENTION

1. Field of the Invention

The invention relates to a device for dividing laminated glass, especially twin-pane laminated glass, with two plate-shaped supports for the laminated glass, in which one of the two essentially horizontally aligned supports is rigidly attached in the machine frame and the other support is mounted to swivel around a horizontal axis located in the area between the supports and can move in the direction of the plane of the support fixed to the machine transversely to the latter support, with means for fixing the laminated glass on the supports which are located on the support edges adjacent to the area between the two supports, with cutting tools which can be moved in the abutting area between the two supports for scratching the laminated glass on both sides, and with a means for splitting the plastic film located between the two laminated glass panes.

2. Description of the Related Art

A device of this type is known from EP 596 852 A1. In this known device, in contrast to earlier proposals in which the film is melted between the laminated glass panes by supplying heat, the film will be split using a plasma jet which is moved along the opened fracture line in the laminated glass. This device has proven effective in and of itself, however the cost of using a plasma jet or as likewise proposed a laser beam is relatively high; this relates both to engineering and also safety regulations.

SUMMARY OF THE INVENTION

The object of the invention is to devise a reliable device for dividing laminated glass which operates without a heat supply and which has a simple structure, proceeding from the device of the initially mentioned type.

According to the invention, this object is achieved by the device for splitting the plastic film being a cutting device which has one blade and which can be moved in the area between the two supports.

Advantageous and preferred embodiments of the invention are the subject matter of the subclaims.

In the device according to the invention for splitting the film between the laminated glass panes a cutting device with one blade is used; this has the advantage that special measures for producing a laser beam or plasma jet or the heating of air or operation of an infrared radiation source are unnecessary. It is simply enough to move the blade of the cutting device along the opened fracture in the laminated glass; this is easily possible since there are slides and guides anyway along which the cutting tools which act on the laminated glass from the top and from the bottom are moved.

BRIEF DESCRIPTION OF THE DRAWINGS

Other details, features and advantages of the invention follow from the following description of the embodiments of the invention in which reference is made to the attached, partially schematic drawings.

DESCRIPTION OF THE PREFERRED EMBODIMENTS

Figure 1:
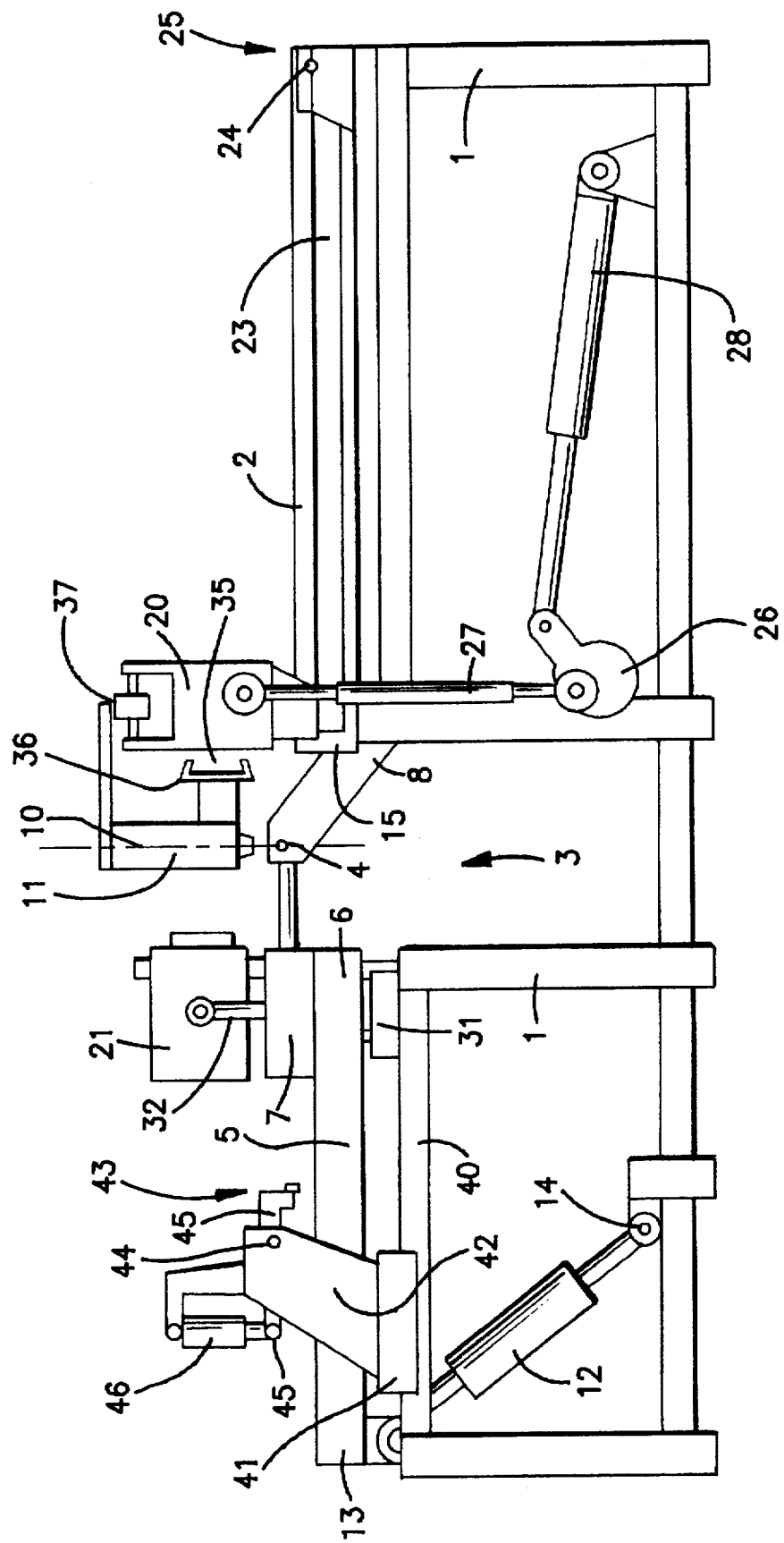
FIG. 1 shows a first embodiment of a device for separating laminated glass in a side view.

The embodiment of a laminated glass cutting machine shown in FIG. 1 according to the invention has machine frame 1, in which in FIG. 1 on the right there is fixed support 2 for the laminated glass to be cut. Fixed support 2 is provided for example with a felt coating and has openings which can be selected to be pressurized with positive pressure or negative pressure so that feed of the laminated glass to be divided is facilitated (air cushion) or it can be held securely if the openings in support 2 are pressurized with negative pressure.

At a distance (gap 3) next to fixed support 2 there is support 5 (left in FIG. 1) which can be swivelled around axis 4 in machine frame 1. In the area of edge 6 of swivelling support 5, said edge facing gap 3 between two supports 2 and 5, two hydraulic motors 7 are mounted with piston rods which are swivel mounted on brackets 8. Brackets 8 are mounted on both sides of machine frame 1 in the area of fixed support 2. Axle 4 around which support 5 can be swivelled is in plane of symmetry 10 of gap 3 between supports 2 and 5 in which also the cutting tools (one from the top and one from the bottom) and cutting means 11 for separating the film provided between the laminated glass panes take effect.

To swivel support 5 which on the left in FIG. 1 there is hydraulic motor 12 which is coupled to edge 13 of the frame of support 5 roughly in its center, said edge opposite gap 3 between two supports 2 and 5, and is supported with its other end in bearing 14 which is fixed to the machine.

Clamp beams 20 and 21 which can be lowered onto supports 2 and 5 in order to fix the laminated glass to be divided on supports 2 and 5 are assigned to two facing edges 15 and 6 of two supports 2 and 5. In addition, in supports 2 and 5 in the area of their edges 6, 15 which face one another there can be suction devices (like suction device 22 of FIG. 2) which can be pressurized with negative pressure in order to support retention of the laminated glass to be divided. In particular, these suction devices can also be used to fix the laminated glass which has been aligned accordingly for a cut relative to the cutting tools until clamp beams 20, 21 have been lowered.

Clamp beam 20 assigned to fixed support 2 is carried by two connecting rods 23 which are swivel supported in machine frame 1 via ball pivots 24 in the area of edge 25 of fixed support 2, said edge facing away from gap 3 between two supports 2, 5. To raise and lower clamp beam 20 relative to fixed support 2 there is a crank-slide rod drive (crank 26, slide rod 27, cylinder 28).

Clamp beam 21 on movable support 5 is guided in the example from FIG. 1 by two guide rods 30 which are provided in the area of the ends of clamp beam 21 and which pass through guide sleeves provided there. To raise and lower clamp beam 21 there are spindle drives 31 which engage on both its ends, with spindles 32 joined to clamp beam 21. Guide rods 30 and the spindle nuts of spindle drives 31 are mounted on the frame of support 5. To effect uniform lifting of clamp beam 21 which is assigned to movable support 5 two spindle drives 31 are coupled via shafts to a common drive motor.

On clamp beam 20 which is assigned to fixed support 2 there is guide rail 35 on which a cutting tool and cutting means 11 are movably guided via slide 36. To move the cutting tool and cutting means 11 along gap 3 between two supports 2 and 5 in plane of symmetry 10 there is continuous belt drive 37 to which slide 36 is coupled.

A cutting tool which acts from underneath on the laminated glass in order to scratch its lower pane is guided on a guide rail (not shown) which is attached to edge 15 of fixed support 2, said edge facing gap 3 between two supports 2 and 5.

On guide rails 40 mounted on machine frame 1, on both sides of movable support 5 slides 41 are mounted which support stop strip 43 on arms 42 which project upward and which are connected to one another. Stop strip 43 is swivel mounted on arms 42 around axle 44 parallel to support 5 so that it can be raised or lowered. To do this stop strip 43 is attached to levers 45 which can be swivelled around axle 44 and which hydraulic cylinder 46 engages. Raising and lowering of stop strip 43 are used to allow movements of swivelling support 5.

Figure 4:
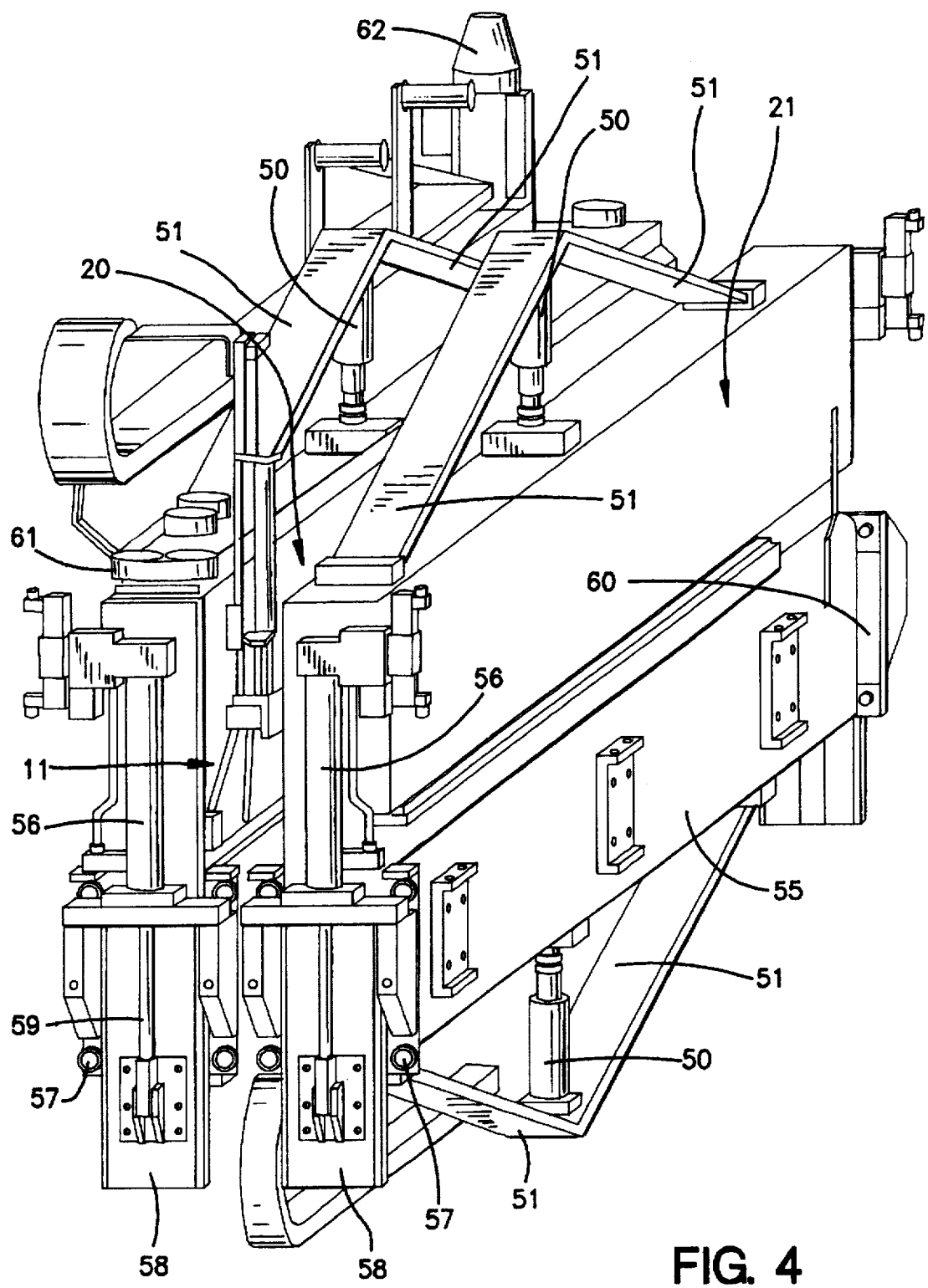
FIG. 4 shows another embodiment of a device for cutting laminated glass in the area of the joint gaps between the two supports.

To prevent deflection of clamp beams 20, 21 if this laminated glass presses against supports 2 and 5, in the center of two clamp beams 20, 21 there can be vertical members 50 (FIG. 4) which point upward, from which tie rods 51 are guided to the two ends of clamp beams 20, 21 and are attached there. By prestressing tie rods 51 by activating vertical members 50 which are executed as hydraulic cylinders, clamp beams 20, 21 are also prestressed so that laminated glass is pressed uniformly over the entire length against support 2 and 5. Similarly structured bracing with vertical members 50 which point downward can be provided on edges 15, 6 of supports 2 and 5, said edges adjacent to gap 3, or on the parts of machine frame 1 or of the frame of supports 2, 5 which are located there (FIG. 4).

Figure 2:
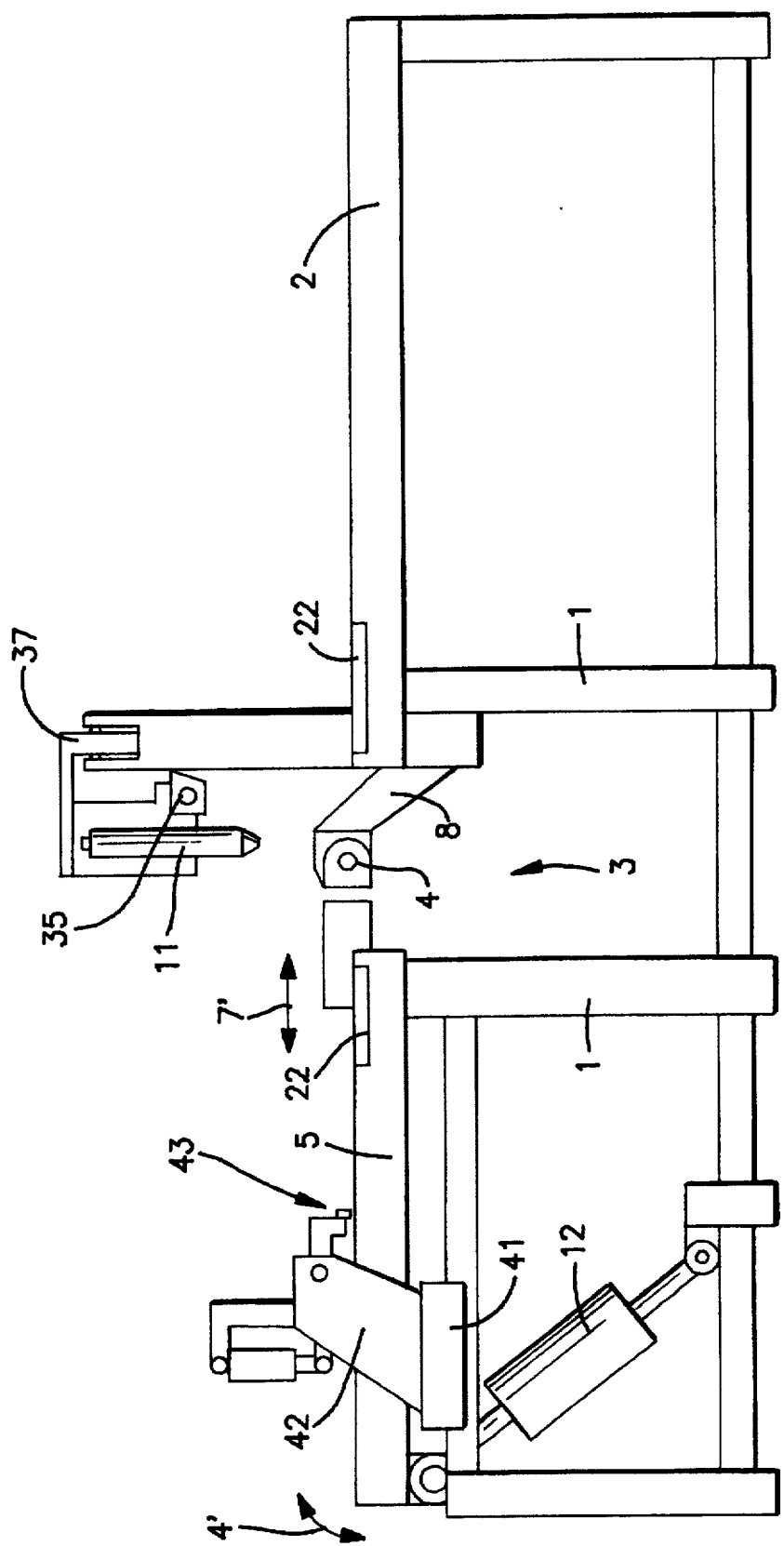
FIG. 2 shows another embodiment.

The device shown in FIG. 2 has two supports 2 and 5 which can be executed as an air cushion table to facilitate transport and/or can be equipped with conveying means (transport belts). Supports 2 and 5 are mounted in machine frame 1, support 2 being rigidly mounted in machine frame 1, conversely support 5 can swivel (arrow 4') around axle 4. Since support 52 is attached via at least two hydraulic motors 7 to bearings 4 fixed on the machine, it can additionally be moved away in the sense of double arrow 7' from support 2 and can be caused to approach support 2 again. To execute swivel motion of support 5 there is at least one hydraulic motor 12 which is preferably a double acting hydraulic motor with zero position which corresponds to the location of support 5 in which it is aligned parallel to support 2.

In the area of gap 3 between supports 2 and 5 there are a cutting tool and cutting means 11 for splitting the plastic film provided between the laminated glass panes.

In machine frame 1 in the area of support 5 there is movable stop 43 for establishing the cutting position.

In order to be able to fix the laminated glass to be divided on supports 2 and 5, there is in supports 2 and 5 at least one row of suction devices 22 which are connected to a negative pressure source via lines which are not shown. These rows of suction devices are provided in the vicinity of edges 6, 15 of supports 5 and 2, said edges adjacent to gap 3.

Figure 3:
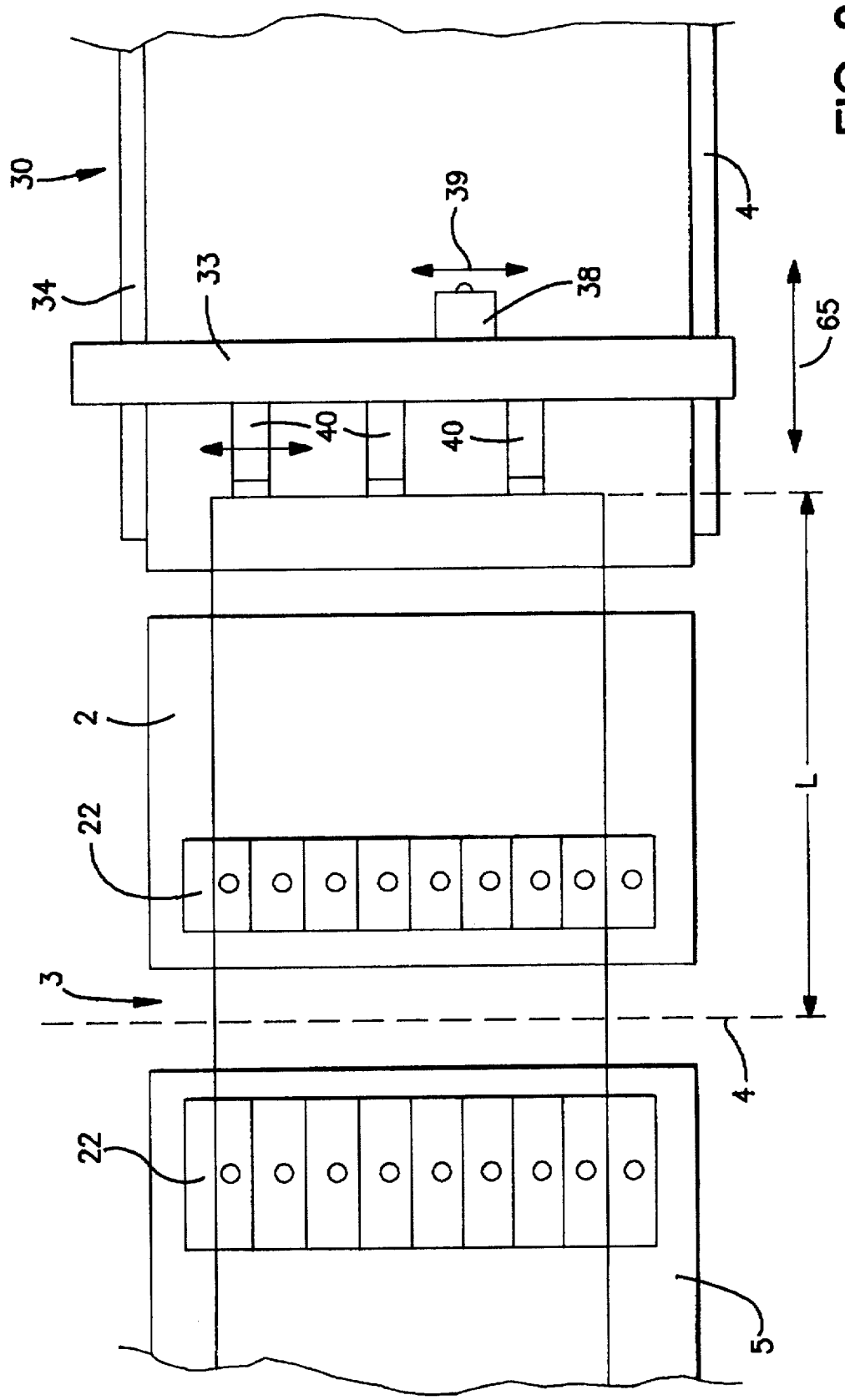
FIG. 3 shows the possibility of locating a device according to the invention directly next to a glass cutting table.

As is apparent in particular from FIG. 3, suction devices 22 are located directly next to one another. Suction devices 22 can be pressurized with negative pressure independently of one another so that only suction devices 22 which are covered entirely by laminated glass are pressurized with negative pressure. Suction devices 22 which lie outside the laminated glass or only partially covered suction devices are not pressurized with negative pressure. For this reason there can be an automatic control which acquires the width of the laminated glass and which activates covered suction devices 22. But also valves which close when no negative pressure builds up in suction device 22 can be assigned to suction devices 22. The embodiment shown in FIG. 2 is intended preferably for thin laminated glass. It goes without saying that also combinations of the means which are shown in FIGS. 1 through 6, with which laminated glass is positioned and retained on supports 2 and 5 during scratching, breaking and splitting of the film are possible.

The arrangement shown in FIG. 3 in an overhead view consists of glass cutting table 30 along which cutting bridge 33 can move on guide rails 34. On cutting bridge 33 in its longitudinal direction cutting head 38 can move which carries scratching tool 39 for scratching panes of glass.

In addition to one edge of cutting table 30 which is aligned parallel to cutting bridge 33 there is a device for dividing the laminated glass. This device can have the embodiment shown in FIGS. 1, 2 and 4 through 14.

In order to align laminated glass along the zero line (=axle 4) which is drawn as a broken line in FIG. 3, on cutting bridge 33 there is a stop which in the embodiment shown consists of three stop parts 40. Stops 40 are aligned opposite zero line 4 by adjusting cutting bridge 33 (arrow 65 in FIG. 3) such that they have a distance from zero line 4 which corresponds to size L of the section of laminated glass to be produced. At this point the laminated glass is advanced until its front edge abuts stop parts 40, whereupon the laminated glass can be divided. To transport the separated part of the laminated glass away and to deliver (normal) flat glass which is to be scratched on cutting table 30, stops 40 are raised from the bearing surface of glass cutting table 30.

Figure 5:
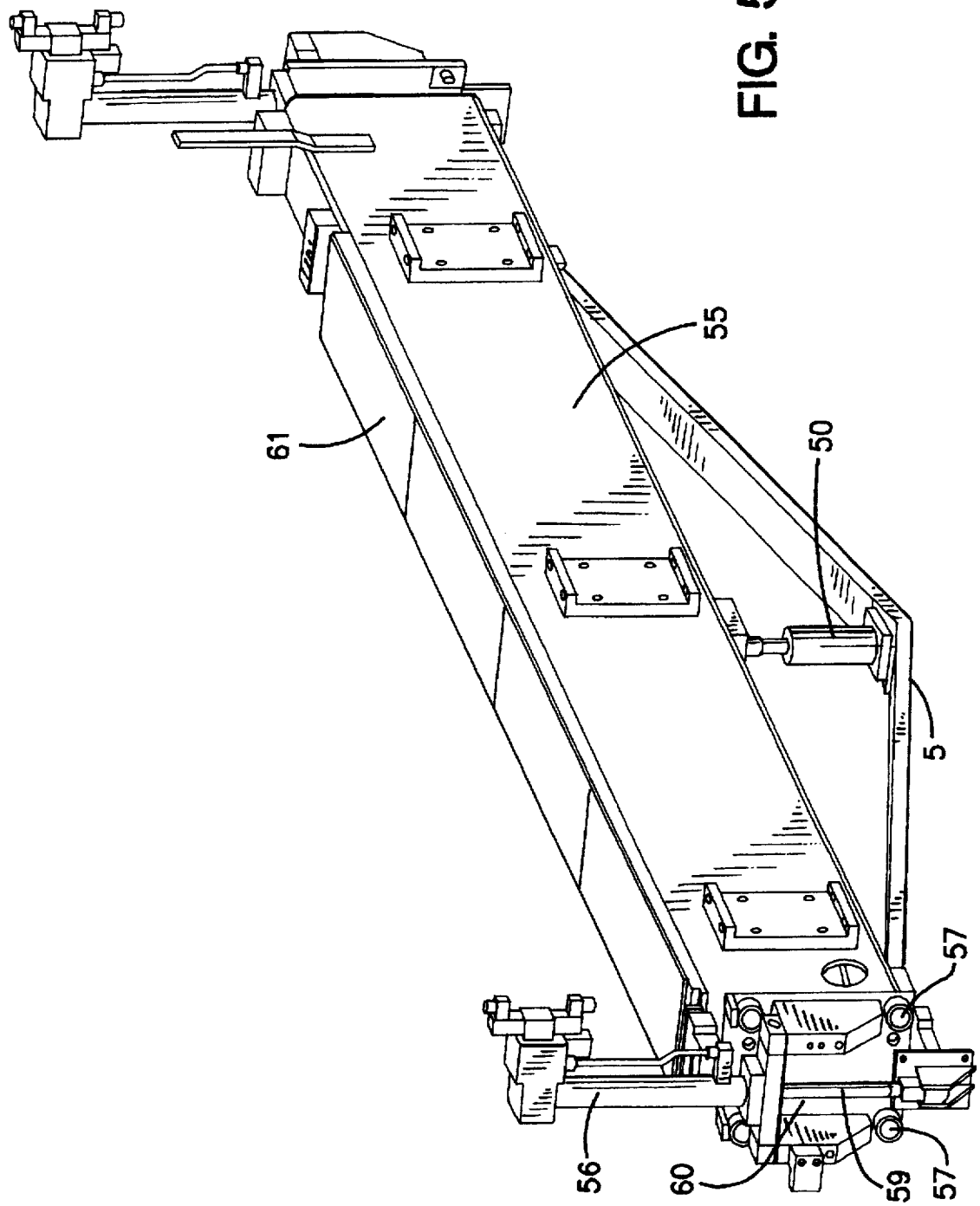
FIGS. 5 and 6 show individual parts of the clamping device for fixing the laminated glass on the supports.
Figure 6:
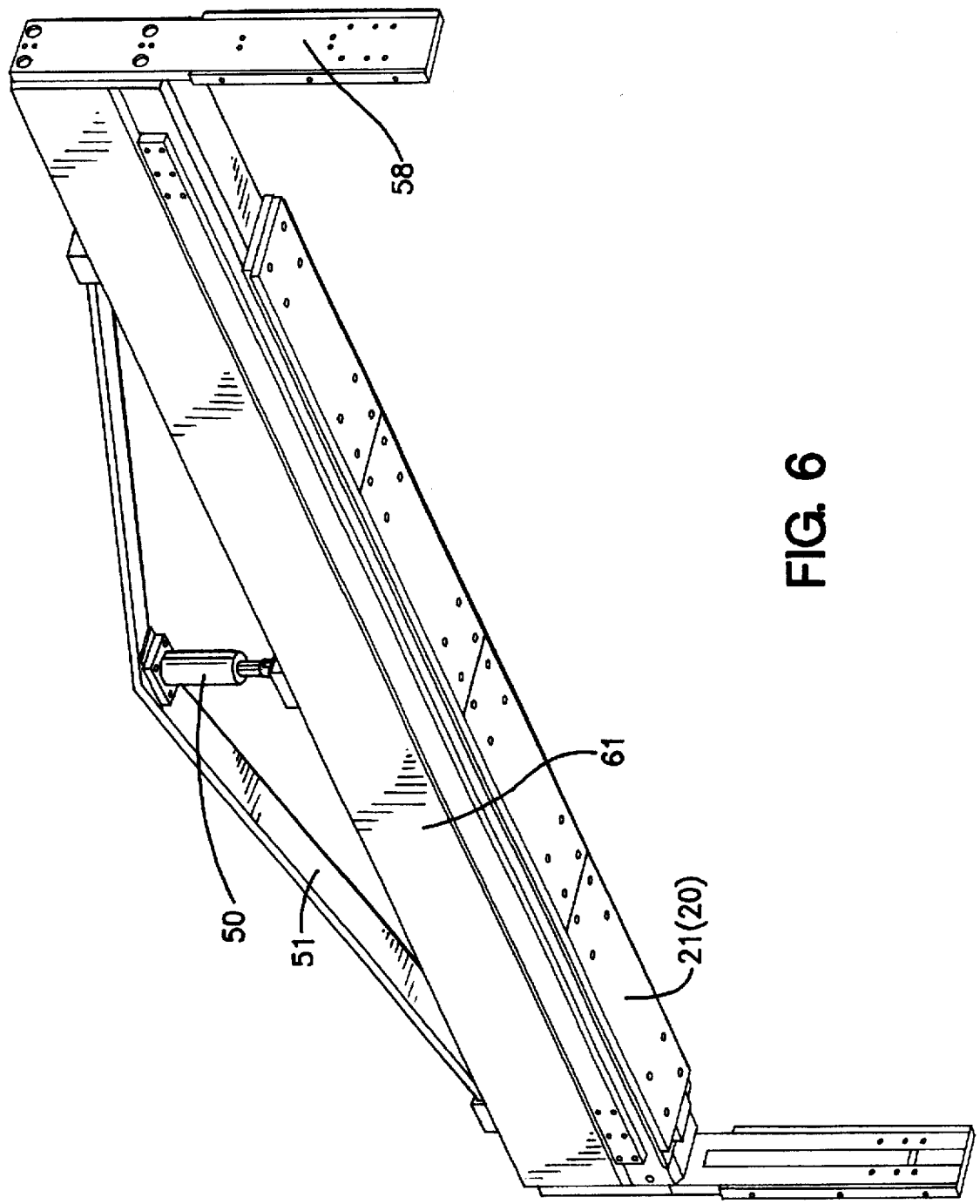

In the embodiment shown in FIGS. 4 through 14 of a device according to the invention, in the area of the ends of two supports 2, 5, said ends adjacent to gap 3, there are clamping means 20, 21 of the embodiment shown in FIG. 4. In this case the parts of the clamping means (bracing beams 55) which are located under supports 2, 5 are securely joined to the machine frame parts which carry supports 2 and 5 (stationary support 2 or frame of the plate of movable support 5), against which bracing beams 55 which are located above supports 2 and 5 can be adjusted up and down using hydraulic cylinders 56, i.e., raised and lowered perpendicularly to supports 2 and 5. The details of one of clamping beams 20, 21 are shown in FIG. 6, against which details of one of bracing beam 55 are shown in FIG. 5. FIG. 5 also shows the arrangement of hydraulic cylinders 56 which move upper clamp beams 20, 21 perpendicularly to supports 2,5.

FIG. 5 shows that on the ends of bracing beams 55 there are guide rollers 57 which are mounted on a plate and which abut lateral, plate-shaped guide projections 58 of clamp beams 20, 21 from the outside and guide them perpendicularly to the plane of supports 2 and 5. To couple clamp beams 20, 21 to cylinders 56 which drive them, piston rods 59 of actuating cylinders 56 are coupled to guide projections 58 of clamp beams 20, 21, conversely cylinders 56 are attached to base plate 60 which carries guide rollers 57. The entire arrangement of drives for clamp beams 20, 21 is also shown in FIG. 4.

On the surfaces of clamp beams 20, 21 and bracing beams 55 facing one another supports 61 are attached.

FIG. 4 also shows that in the embodiment shown in FIGS. 4 through 14 the two cutting tools and means 11 for splitting the plastic film are located between the laminated glass panes on clamp beam 20 which is assigned to fixed support 2 or bracing beam 55 which is assigned to this support, i.e., they can move on guide rails which are attached directly or indirectly to these parts. Also the drives (for example, continuous belt drive 61 shown in FIG. 4 for the combined scratching and splitting means (cutting tool and cutting means 11)) are erected on clamp beams 20 in the same manner as assigned drive motor 62.

Means 11 for splitting the plastic film between the laminated glass panes is (see FIGS. 7 and 8) mounted on plate 70 which is guided on two guide rods 71 via slide bushes 72 and which can be adjusted along these guide rods 71 by hydraulic cylinder 73 perpendicularly to the plane of two supports 2, 5. On plate 70 holder 75 for blade 76 is mounted to swivel around horizontal axle 74 which is parallel to the plate. The swivelling capacity of holder 75 around axle 74 can be blocked using locking wedge 78 which is activated by hydraulic cylinder 77 and can be released again by lifting locking wedge 78.

On the lower end of holder 75 is mounted base plate 70 which bears on one end clamping means 80 for fixing of blade 76. Clamping means 80 consists of blade holding fixture 81 which is permanently joined to base plate 79, and clamp plate 82 which can be clamped using clamping lever 83 to fix blade 76 against blade holding fixture 81.

Furthermore, on base plate 79 carrier 84 for measurement and following wheel 86 is supported around axle 85 which is aligned perpendicularly to the direction of movement of the cutting tools in the area between two supports 2 and 5 and also horizontally. The free end of this carrier 84 is coupled to switch 87. Measurement and following wheel 86 runs in a wedge-shaped gap which is formed by separating the two parts of the laminated glass pane (after breaking the two glass panes, see FIG. 9) and when it runs up against an obstacle which may be present in the gap moves out of the latter upward so that switch 87 is activated and causes blade 76 to be lifted out of the gap. When blade 76 is moved along the gap between the laminated glass parts, the lock is released for the swivelling capacity of holder 75 around axle 74 (locking wedge 78 is lifted) so that blade 76 always runs in the center of the gap guided by measurement and following wheel 86 which runs opposite the edges of the gap. Instead of switch 87 there can also be an element which acquires the swivelling of carrier 84 for guide wheel 86, for example, an electronic rule. By means of signals delivered by the latter the turning (still to be explained) of support 5 can be controlled to open the fracture into a wedge-shaped gap such that guide wheel 86 and thus blade 76 dip far enough into the wedge-shaped gap to reliably cut through the film.

Figure 7:
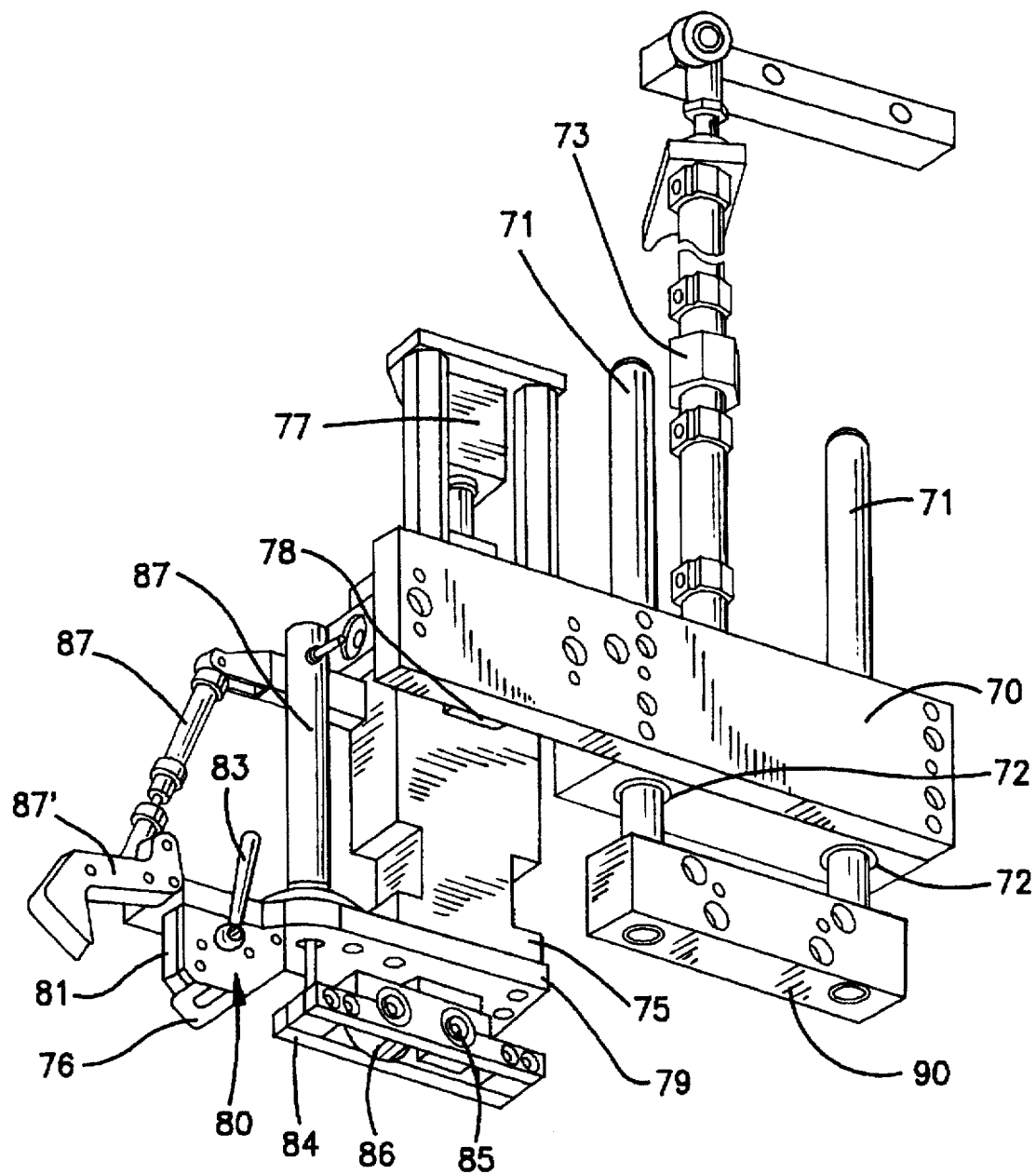
FIG. 7 shows the cutting means with the blade in an oblique view.
Figure 8:
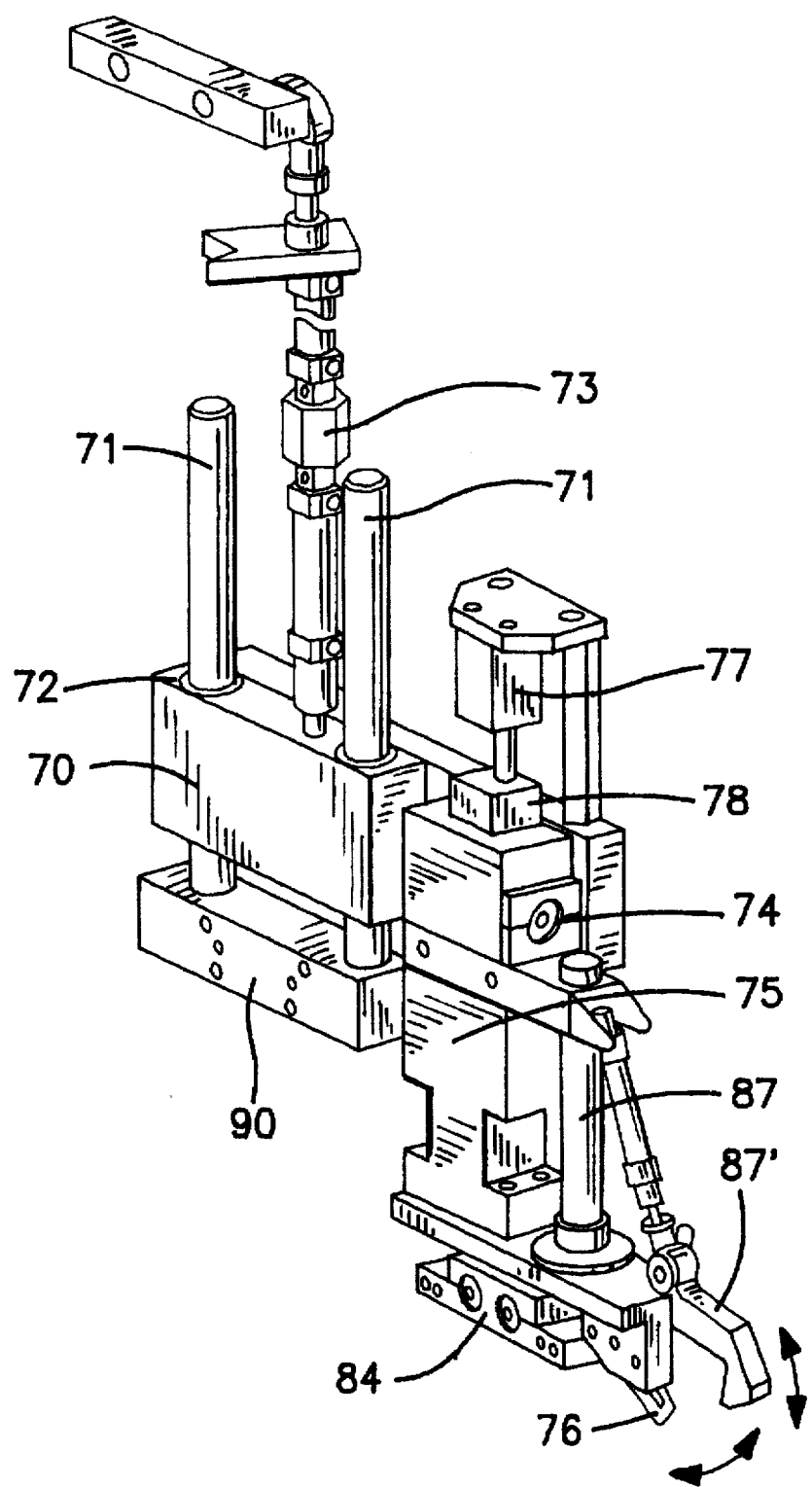
FIG. 8 shows the cutting means in another view and FIGS. 9.1. to 9.4.1. show individual phases in separating the laminated glass with the device according to the invention.
Figure 10:
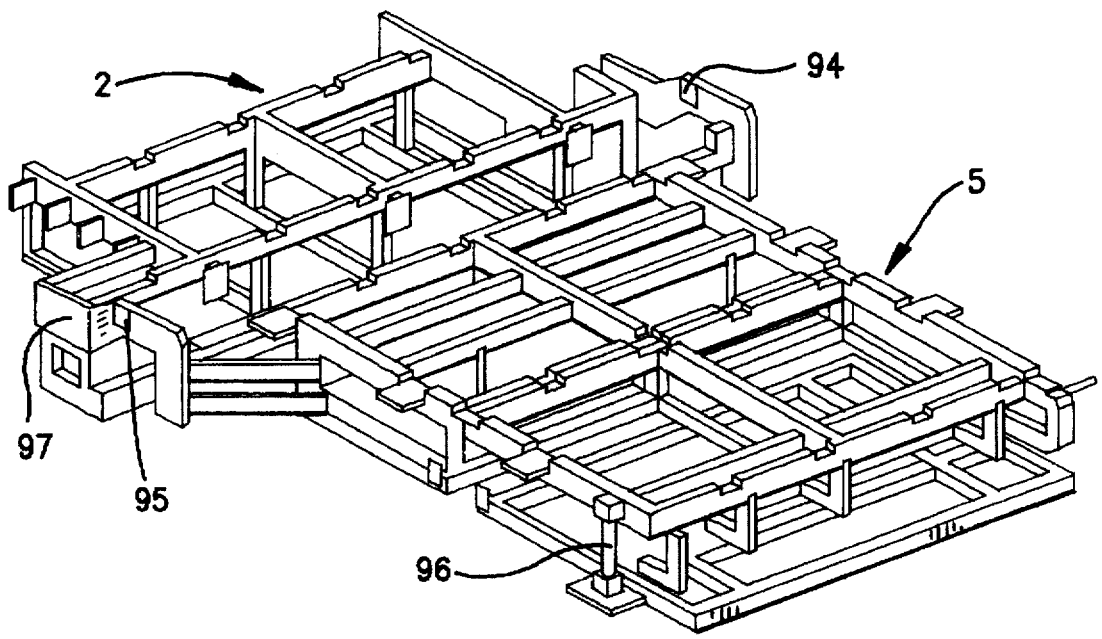
FIG. 10 shows the machine frame without the support plates and the clamping means.
Figure 11:
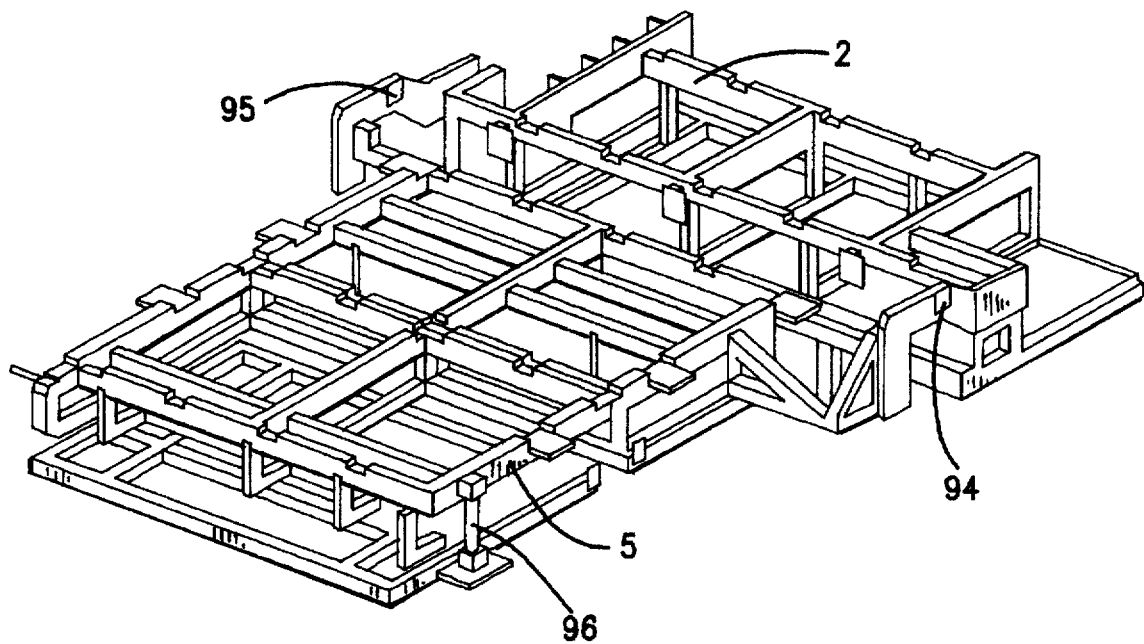
FIG. 11 shows the machine frame in another view and FIGS. 12, 13, and 14 show details of the bearing of the swivelling support in various views.
Figure 12:
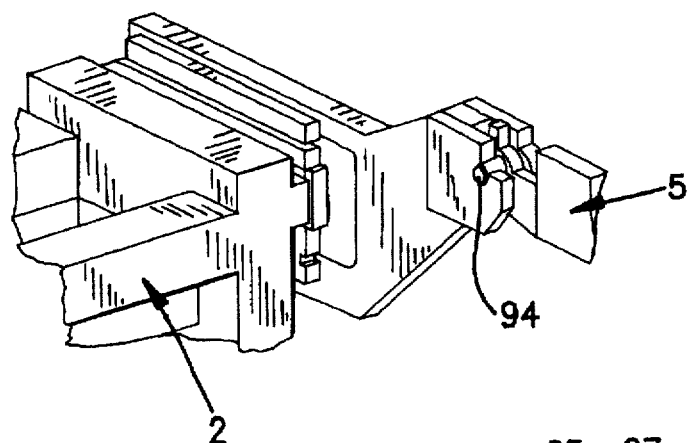

On base plate 79 there is furthermore safety flap 87 for blade 76 with a swivelling capacity which can be swivelled using hydraulic cylinder 88 into a position which releases blade 76, which is shown in FIG. 7, and which overlaps blade 76.

On block 90 which is located underneath on guide rods 71 there is a conventional cutting tool (cutting wheel) (not shown) for scratching the upper pane of laminated glass. A similar cutting tool is mounted on a slide which can move under the support plane for the laminated 91ass on a guide, both glass panes of laminated glass being scratched preferably by the cutting tools at the same time, i.e., from the top and bottom.

The progression of functions glass cutting, breaking and separating the film is shown and explained in FIG. 9. It is apparent from FIG. 9 that for laminated glass clamped between clamp beams 20, 21 and abutments 55 cutting takes place above and below at the same time (FIG. 9.1). Hereupon first the upper (or the lower) and then the lower (or the upper) glass pane is broken by swivelling movable support 5 so that a continuous break is formed along the scratch lines produced beforehand (FIGS. 9.2 and 9.3). Hereupon support 5 which can move relative to machine-fixed support 2 together with clamp beam 21 and the abutment (bracing beam) 55 opposite the latter (underneath) is swivelled around fulcrum 90 which lies outside of supports 2, 5 without tilting it so that the end of the fracture which is at a distance from fulcrum 90 is opened and the film is stretched there (see FIG. 9.4.1). Guided by measurement and following roller 86 blade 76 is now lowered in gap 91 between the laminated glass parts and cuts through the film as movement continues along gap 91. In this case the movable support is increasingly swivelled, as is illustrated from FIG. 9.4.1 by the rotary positions shown.

In order to be able to swivel movable support 5 for breaking (around horizontal axle 4 which is located in the area of gap 3 between two supports 2, 5) and furthermore in order to be able to turn around a vertical axle (fulcrum 90) which is located outside of supports 2, 5 the machine frame is formed as shown as in FIG. 10 through 14 (without the plates which form the actual supports). End 6 of movable support 5 facing fixed support 2 can be swivelled around two bearings 94, 95 with axes which are located at the level of the support surface (see FIG. 9.2 and 9.3). To do this, on the frame of movable support 5 on both sides hydraulic cylinder 96 (corresponding to cylinder 12) is attached, with which the end of support 5 which is remote from gap 3 for breaking laminated glass after it has been scratched can be raised and lowered (see FIGS. 9.2 and 9.3).

Figure 13:
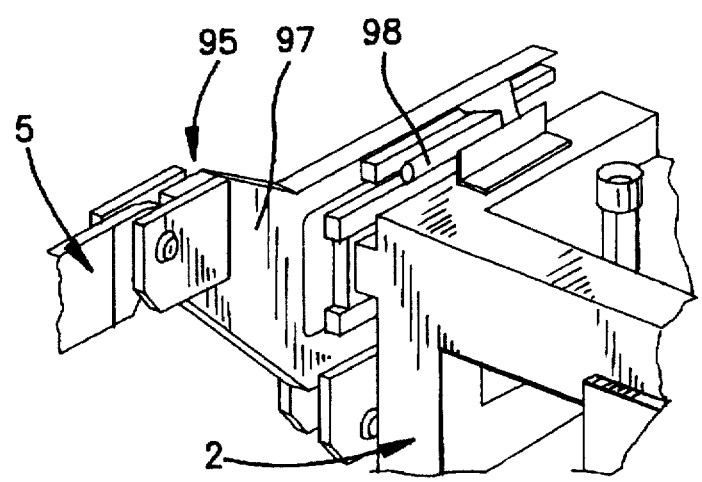
Figure 14:
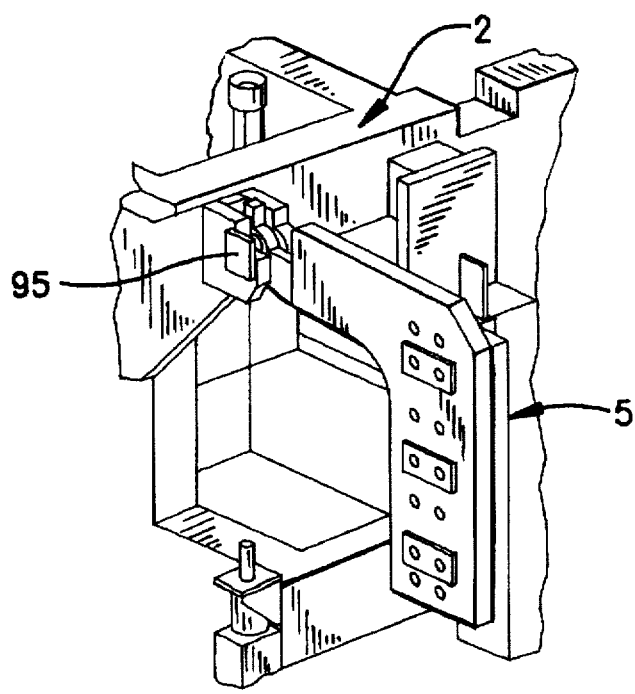

In addition, one of the two swivel bearings, specifically bearing 95, can be adjusted (horizontally) in a direction parallel to the support surface, as is shown in FIGS. 13 and 14. By actuating the hydraulic motor (not shown) which engages carrier 97 of bearing 95 movable support 5 turns around fulcrum 90 which is shown in FIG. 9.4.1. and which is formed by bearing 94 so that the fracture opens into a wedge-shaped gap in the two laminated glass panes, as is shown in FIG. 9.4.1. The amount of rotation of movable support 5 is acquired by for example electronic measurement means 98 which also controls activation of the hydraulic cylinder for rotating support 5.

In summary the invention can be described as follows:

A device for dividing laminated glass has support 2 which is mounted fixed and movable support 5. Clamp beams 20, 21 for fixing the laminated glass to be divided on supports 2 and 5 are assigned to supports 2 and 5. After the laminated glass to be divided has been fixed on supports 2 and 5 aligned accurately by activating clamp beams 20, 21, at the same time the upper and the lower laminated glass pane is scratched. By swivelling support 5 the laminated glass is broken, thereupon the movable support is turned around fulcrum 90 which lies outside of supports 2, 5 in the plane of fixed support 2, so that the fracture between the two glass panes opens into a wedge-shaped gap. Into wedge shaped gap 91 guide wheel 86 is inserted which guides blade 76 which follows it in the center of gap 91. Blade 76 is attached to a floating suspended carrier 75 so that it can follow the gap under the action of guide wheel 86. During splitting of the film using blade 76 movable support 5 is further swivelled so that gap 95 is gradually opened farther.

I claim:

1. A device for dividing laminated glass, comprising:

first and second plate-shaped supports for the laminated glass, said supports being essentially horizontally aligned, said first support being rigidly attached in a machine frame and said second support being mounted to swivel around a horizontal axis located in an area between said supports and being able to move in a direction of a plane of said first support, said first support being fixed to the machine transversely to said second support, means for fixing the laminated glass on said supports, said means for fixing being located on edges of said supports, said edges being adjacent to said area between said supports, cutting tools which can be moved in said area between said supports for scratching the lamp means for on both sides, and means for splitting a plastic film located between two panes of said laminated glass, wherein the means for splitting the plastic film comprises cutting means with a blade which can move in said area between said supports, wherein further a holder for said blade is mounted on a holder slide to swivel around a horizontal axle which is aligned in a direction of movement of said holder slide.

2. Device according to claim 1, wherein said blade is inserted into a holding fixture which is erected on a fixture slide which also carries one of the cutting tools.

3. Device according to claim 1, wherein said holder for said blade is erected on one of the cutting tools which acts from overhead on an upper laminated glass pane.

4. Device according to claim 1, wherein said holder for said blade can be adjusted independently of the cutting tools perpendicularly to the plane of the first support.

5. Device according to claim 1, wherein said holder for said blade is further guided on two guide rods which carry the cutting tool on their free ends.

6. Device according to claim 1, wherein said blade is clamped on said holder using a clamping device.

7. Device according to claim 1, further comprising a cover cap which can be swivelled on said holder and which can be swung into a position which covers said blade.

8. Device according to claim 1, further comprising:

a carrier which is coupled to a switch and pivotally attached to said holder through a horizontal axle with an axis of rotation perpendicular to a direction of motion of said blade, and a freely rotating wheel mounted to said carrier.

9. Device according to claim 1, further comprising a device actuated by a linear motor for fixing of said holder for said blade to prevent said swivelling capacity.

10. Device according to claim 1, wherein the means for fixing the laminated glass are clamp beams which act from overhead on the laminated glass, and wherein said clamp beams are guided on both ends in guides which are perpendicular to the plane of the first support and a plane of the second support, said device further comprising actuating cylinders which are supported on said supports and which engage ends of said clamp beams.

11. Device according to claim 10, further comprising:

upwardly pointing vertical members attached to a center of said clamp beams, and tie rods clamped between an upper end of each vertical member and the two ends of each said clamp beam.

12. Device according to claim 11, wherein said vertical member is of variable length.

13. Device according to claim 12, wherein said vertical member of variable length is a hydraulic cylinder.

14. Device according to claim 1, wherein said second support which can swivel around said horizontal axis can also be turned around a fulcrum which is located laterally to the area between said supports in a plane which is aligned with the plane of said first support.

15. Device according to claim 14, further comprising first and second swivel bearings supporting said second support, wherein said first swivel bearing is rigidly mounted on a frame of the device, and wherein said second swivel bearing is mounted on an auxiliary carrier which can be moved parallel to the plane of said first support.

16. Device according to claim 1, wherein said holder for said blade is mounted on a plate which is erected on a slide of one said cutting tool.

17. Device according to claim 16, wherein said holder for said blade on said plate can be swivelled around said horizontal axle which is aligned in the direction of movement of the slide.

18. Device according to claim 1, further comprising bracing beams attached to said edges of said first and second supports, said edges adjacent to said area between said two supports.

19. Device according to claim 18, further comprising downward pointing vertical members disposed in a center of the bracing beams, and tie rods which extend from said vertical member to ends of said bracing beams.

20. Device according to claim 19, wherein said vertical members are of variable length.

21. Device according to claim 20, wherein the vertical members are hydraulic motors.

22. Device according to claim 10, further comprising:

bracing beams attached to said edges of said first and second supports, and glass supports disposed on mutually facing surfaces of said clamp beams and said bracing beams, wherein said glass supports directly abut the laminated glass to be divided, said glass supports on said bracing beams being aligned with tops of said first and second supports.

23. Device according to claim 1, further comprising a guide wheel disposed on said holder.

24. Device according to claim 1, further comprising a guide wheel rotatably disposed on a carrier, wherein said carrier is rotatably mounted to one of said holder and a base plate attached to the holder.

25. Device according to claim 24, further comprising one of a switch and a rule disposed between an end of the carrier opposite a rotation axle of said carrier and said holder, wherein said one of a switch and a rule receives movements of said carrier.

26. Device according to claim 23, wherein said guide wheel, relative to a direction of movement of said cutting means, is located in front of said blade.

27. Device according to claim, further comprising an adjustable stop for fixing a cutting position of the laminated glass.

28. Device according to claim 27, wherein said adjustable stop is disposed upon said second support.

29. Device according to claim 27, further comprising a stop strip for the laminated glass, said stop strip being attached above said second support to stop strip slides which can be moved on fixed guide rails located next to transverse edges of said second support.

30. Device according to claim 29, further comprising arms attached to said stop strip, said arms being attached to a shaft whose end is supported in said stop strip slides and which can be turned by at least one hydraulic motor so that said stop strip can be raised and lowered.

31. Device according to claim 1, wherein the means for fixing the laminated glass on said first and second supports comprises, on at least one of said first and second supports, a negative pressure suction device which consists of several suction devices located in an area of said edges of each of said first and second supports adjacent to other of said first and second supports.

* * * * *